United States Patent
Degawa et al.

(10) Patent No.: US 6,528,756 B2
(45) Date of Patent: Mar. 4, 2003

(54) LASER LAP WELDING PROCESS OF WELDING TOGETHER OVERLAPPED PLATED STEEL SHEETS

(75) Inventors: Hidetaka Degawa, Shinjuku-ka (JP); Shoji Kojima, Shinjuku-ka (JP); Tomotaka Nagase, Shinjuku-ka (JP); Hiroki Saito, Shinjuku-ka (JP); Kazuyuki Hoshino, Shinjuku-ka (JP); Satoshi Ueda, Shinjuku-ka (JP); Koji Tomita, Shinjuku-ka (JP); Kosuke Kawai, Shinjuku-ka (JP); Hiroshi Shimazaki, Shinjuku-ka (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 9 days.

(21) Appl. No.: 09/821,838

(22) Filed: Mar. 29, 2001

(65) Prior Publication Data

US 2001/0047983 A1 Dec. 6, 2001

(30) Foreign Application Priority Data

Mar. 30, 2000 (JP) ........................................ 2000-094940
Mar. 30, 2000 (JP) ........................................ 2000-094941
Mar. 30, 2000 (JP) ........................................ 2000-094942

(51) Int. Cl.$^7$ ............................................. B23K 26/20
(52) U.S. Cl. ............................................. 219/121.64
(58) Field of Search ........................ 219/121.6, 121.63, 219/121.64, 121.65, 121.66, 121.85

(56) References Cited

U.S. PATENT DOCUMENTS 4,745,257 A * 5/1988 Rito et al. .............. 219/121.64
5,104,032 A * 4/1992 Spies et al. ............ 219/121.64
5,603,853 A * 2/1997 Mombo-Caristan .... 219/121.14

FOREIGN PATENT DOCUMENTS

DE          3909471 A  *  9/1990  ............ 219/121.64

OTHER PUBLICATIONS

Patent Abstracts of Japan 11–226765, Aug. 24, 1999, Isuzu Motors Ltd.

Patent Abstracts of Japan 05–154678, Jun. 22, 1993, Kawasaki Heavy Ind Ltd.

* cited by examiner

Primary Examiner—Samuel M. Heinrich
(74) Attorney, Agent, or Firm—Martin A. Farber

(57) ABSTRACT

Prior to welding together two overlapped plated steel sheets 4 and 5 by laser lap welding that irradiates parts of the plated steel sheets (4, 5) extending on a weld line (Lw), slits (4b) are formed intermittently in the upper plated steel sheet (4) with a laser beam (L). Subsequently, a welding head (1) is moved along the weld line (Lw) while the upper plated steel sheet (4) is pressed against the lower plated steel sheet (5) by pressure rollers. Parts of the upper plated steel sheet (4) extending on the weld line (Lw) and not provided with the slits (4b) are irradiated with the laser beam to laser-weld the plated steel sheets (4, 5) together. A vapor of the component of the coating layers coating the joining surfaces (4a, 5a) of the plated steel sheets (4, 5) produced from the coating layers by the heat produced by the laser beam is discharged through the slits (4b). After thus laser-welding together the plated steel sheets (4, 5), the slits (4b) of the upper plated steel sheet (4) are stopped with a molten metal produced by melting a filler with the laser beam.

12 Claims, 7 Drawing Sheets

LASER LAP WELDING PROCESS OF WELDING TOGETHER OVERLAPPED PLATED STEEL SHEETS

BACKGROUND OF THE INVENTION

1. Field of the Invention

The present invention relates to a laser lap welding process of welding together plated steel sheets for forming automotive bodies or the like.

2. Description of the Related Art

Galvanized steel sheets, i.e., surface-treated steel sheets, have been used in the automobile industry. However, galvanized steel sheets must be galvanized in a large coating weight because zinc coating steel sheets is relatively rapidly corroded.

Hot-dip galvanealed steel sheets are prevalently used. A hot-dip galvanealed steel sheet is manufactured by plating a steel sheet with molten zinc by hot dipping to form a zinc-coated steel sheet, subjecting the zinc-coated steel sheet to an alloying process to suppress the activity of the zinc coating by forming an alloy layer on the surface of the steel sheet through the mutual diffusion of Fe and Zn. The coating weight of the zinc coating of such a hot-dip galvanealed steel sheet, as compared with that of the electrolytic zinc coating steel sheet, can be economically increased. Therefore, the enhancement of the corrosion resistance of the hot-dip galvanealed steel sheet can be easily achieved by increasing the coating weight.

When welding together overlapped zinc plated steel sheets including the hot-dip galvanealed steel sheets by laser lap welding, the coating layers coating the joined surfaces of the overlapped plated steel sheets produce a large amount of zinc vapor and the zinc vapor is sealed in a molten metal. Consequently, the sealed zinc vapor causes the formation of many weld defects that spoil beads, including blow holes in beads, depressions in the surfaces of beads and pits penetrating beads.

Many laser lap welding techniques that form a gas discharge passage between the joining surfaces of the overlapped plated steel sheets have been tried. A laser lap welding process disclosed in, for example, JP-A No. Hei 11-226765 forms irregularities by blasting in the joining surfaces of overlapped plated steel sheets to enable a vapor of a component of the coating layers coating the joining surfaces vaporized by laser lap welding to escape outside through the irregularities.

However, the vapor is unable to escape completely before melted parts of the plated steel sheets solidify when the height of the gap between the joining surfaces, i.e., the distance between the joining surfaces, is excessively small and the aforesaid weld defects are formed in welded parts. On the other hand, the molten metal flows into the gas discharge passage and parts of the plated steel sheet irradiated with a laser beam melt away and the same plated steel sheet is ruptured when the height of the gap is excessively great.

Therefore, when welding together overlapped plated steel sheets by laser lap welding, the height of the gap between the joining surfaces of the plated steel sheets (the distance between the joining surfaces of the plated steel sheets) that define the gas discharge passage must be severely adjusted by using a special bracket, which increases steps of work and reduces production efficiency.

SUMMARY OF THE INVENTION

The present invention has been made in view of the aforesaid problems in the related art and it is therefore an object of the present invention to provide a laser lap welding process of welding together overlapped plated steel sheets, capable of stably discharging outside a vapor of a component of the coating layers formed by plating and coating the joining surfaces of the overlapped plated steel sheets, of welding together the overlapped plated steel sheets in a stable weld quality and of improving production efficiency.

According to a first aspect of the present invention, a laser lap welding process of welding together overlapped first and second plated steel sheets comprises the steps of: forming slits intermittently in the first plated steel sheet to be irradiated with a laser beam along a weld line; and irradiating parts of the first plated steel sheet extending on the weld line and not provided with the slits with a laser beam to weld together the first and second plated steel sheets.

Preferably, the laser lap welding process in the first aspect of the present invention further comprises the step of removing parts of the coating layer of the second plated steel sheet respectively corresponding to the slits intermittently formed in the first plated steel sheet. Preferably, the same laser lap welding process further comprises the step of stopping the slits of the first plated steel sheet by filling the slits with a molten metal and irradiating the molten metal with a laser beam after welding together the first and second plated steel sheets. Preferably, the same laser lap welding process forms the slits intermittently by irradiating parts of the first plated steel sheet extending on the weld line with a laser beam.

The laser lap welding process according to the first aspect of the present invention forms the slits intermittently in the first plated steel sheet and irradiates the parts of the first plated steel sheet extending on the weld line and not provided with the slits with a laser beam to weld together the first and second plated steel sheets. Thus, a vapor produced in the joining surfaces of the plated steel sheets is able to escape outside through the slits intermittently formed in the first plated steel sheet. Consequently, the vapor does not remain in beads formed by laser lap welding, the formation of weld defects including blow holes and pits in the beads can be avoided and the plated steel sheets can be welded together in a stable weld quality. Since any special gas discharge passage does not need to be formed between the joining surfaces of the plated steel sheets, work for laser lap welding is simplified, weld quality is not affected by the shapes of the joining surfaces of the plated steel sheets because the joining surfaces of the plated steel sheets are kept in close contact with each other, the plated steel sheets can be welded together in a stable weld quality and production efficiency can be improved.

According to a second aspect of the present invention, a laser lap welding process of welding together overlapped first and second plated steel sheets comprises the steps of: inserting inserts between the joining surfaces of the first and second plated steel sheets to form a gas discharge passage between parts of the first and second plated steel sheets around a weld line; and irradiating parts of the first and second plated steel sheets extending on the weld line with a laser beam to weld together the first and second plated steel sheets.

In the second aspect of the present invention, it is preferable that the inserts are adhesive members attached to the parts of the first and second plated steel sheets near the weld line. Preferably, the laser lap welding process in the second aspect of the present invention further comprises the step of pressing the parts to which the adhesive members are attached by pressure rollers so that the gas discharge passage is formed in a predetermined height between the joining surfaces of the first and second plated steel sheets. Preferably, the adhesive members are placed on parts of the first and second plated steel sheets extending on the opposite sides of the weld line. Preferably, the adhesive members are separated from a release paper sheet unwound from a roll of release paper sheet and are attached to the joining surface of either of the first and second plated steel sheet.

The laser lap welding process according to the second aspect of the present invention inserts the inserts between the joining surfaces of the first and second plated steel sheets to form the gas discharge passage between the parts of the first and second plated steel sheets around the weld line and irradiates the parts of the first and second plated steel sheets extending on the weld line with a laser beam to weld together the first and second plated steel sheets. Thus, a vapor produced by the coating layers in the joining surfaces of the plated steel sheets is able to escape outside through the gas discharge passage. Consequently, the vapor does not remain in beads formed by laser lap welding, the formation of weld defects including blow holes and pits in the beads can be avoided and the plated steel sheets can be welded together in a stable weld quality. Since the gas discharge passage is formed between the joining surfaces of the plated steel sheets by the inserts, the plated steel sheets do not need to be processed by a special process to form the gas discharge passage and hence the laser lap welding process is simplified. Since the height of a part of the gas discharge passage corresponding to the weld line is dependent on the height of the inserts, the gas discharge passage can be held in an appropriate height during laser lap welding, the height of the gas discharge passage can be easily managed, the plated steel sheets can be welded together in a stable weld quality and production efficiency can be improved.

According to a third aspect of the present invention, a laser lap welding process of welding together overlapped first and second plated steel sheets comprises the steps of: partly deforming at least either of the first and second plated steel sheets so that a space is formed between the joining surfaces of the first and second plated steel sheets when the first and second plated steel sheets are joined, to form a gas discharge passage between parts of the first and second plated steel sheets near a weld line; and irradiating parts of the first and second plated steel sheets extending on the weld line with a laser beam to weld together the first and second plated steel sheets.

In the third aspect of the present invention, it is preferable to form the gas discharge passage by spacing apart the joining surfaces of the first and second plated steel sheets by protrusions formed in either of the first and second plated steel sheets. Preferably, the first and second plated steel sheets are spaced apart from each other by the protrusions so that the respective joining surfaces of the first and second plated steel sheets are inclined to each other and the parts of the first and second plated steel sheets extending on the weld line are spaced a predetermined distance apart from each other. Preferably, the gas discharge passage is formed by partly spacing the respective joining surfaces of the first and second plated steel sheets by a step formed in either of the first and second plated steel sheets. Preferably, the gas discharge passage is formed by partly spacing the respective joining surfaces of the first and second plated steel sheets by a flange having a curved bend formed in either of the first and second plated steel sheets.

The laser lap welding process according to the third aspect of the present invention partly deforms at least either of the first and second plated steel sheets so that a space is formed between the joining surfaces of the first and second plated steel sheets when the first and second plated steel sheets are joined, to form the gas discharge passage between the parts of the first and second plated steel sheets near the weld line and irradiates the parts of the first and second plated steel sheets extending on the weld line with a laser beam to weld together the first and second plated steel sheets. Thus, a vapor produced by the coating layers in the joining surfaces of the plated steel sheets is able to escape outside through the gas discharge passage. Consequently, the vapor does not remain in beads formed by laser lap welding, the formation of weld defects including blow holes and pits in the beads can be avoided and the plated steel sheets can be welded together in a stable weld quality. Since the gas discharge passage is formed between the joining surfaces of the plated steel sheets by the projections or the steps, the laser lap welding process does not need any special bracket, and hence the laser lap welding process is simplified. Since the height of a part of the gas discharge passage corresponding to the weld line is dependent on the height of the projections or the steps, the gas discharge passage can be held in an appropriate height during laser lap welding, the height of the gas discharge passage can be easily managed, the plated steel sheets can be welded together in a stable weld quality and production efficiency can be improved.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

First Embodiment

A laser lap welding process in a first embodiment of the present invention will be described with reference to FIGS. 1 to 5.

Figure 1:
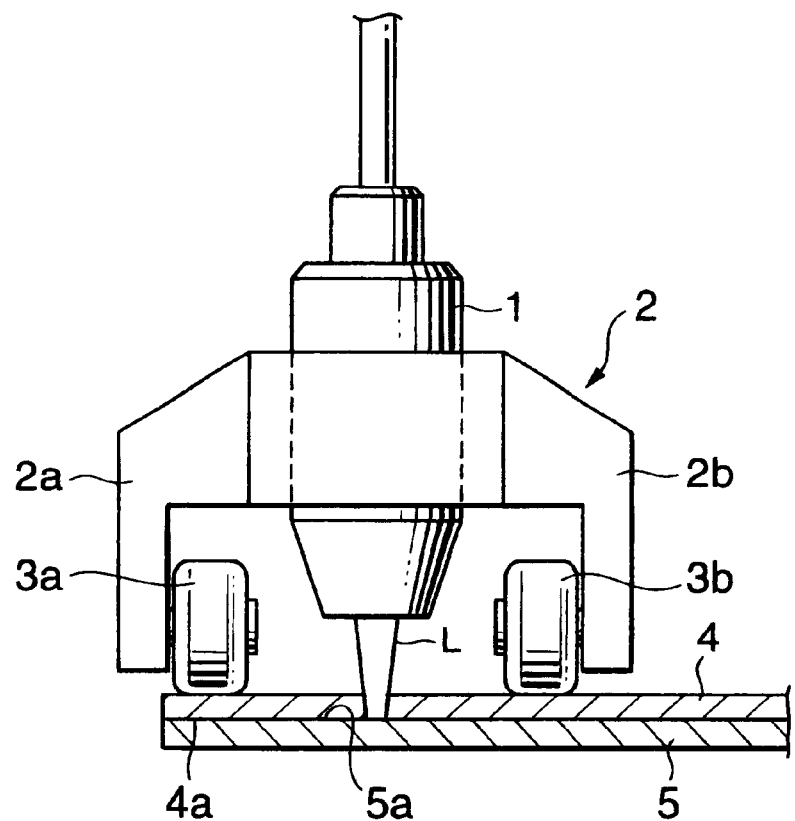
FIG. 1 is an enlarged front elevation of a laser lap welder employed in carrying out a laser lap welding process in a first embodiment of the present invention.

Referring to FIG. 1, a laser lap welder for carrying out the laser lap welding process in the first embodiment has a welding head 1 and a carriage 2 fixed to the welding head 1. Two plated steel sheets 4 and 5 are overlapped. The carriage 2 has a pair of support legs 2a and 2b extending vertically downward from a body fixed to the welding head 1. A pair of pressure rollers 3a and 3b are supported for rotation on lower end parts of the support legs 2a and 2b on the opposite sides of the welding head 1, respectively. The pressure rollers 3a and 3b press parts of the upper plated steel sheet 4 near a part of the same to be irradiated with a laser beam.

The welding head 1 is held on a robot arm, not shown, or the like and is moved along a weld line Lw (FIG. 3) on the two overlapped plated steel sheets 4 and 5 by the robot arm. The pressure rollers 3a and 3b press parts of the upper plated steel sheet 4 extending on the opposite sides of the weld line Lw against the corresponding parts of the lower plated steel sheet 5 while the welding head 1 is moved along the weld line Lw. The welding head 1 emits a laser beam L through its lower end on the weld line Lw to weld together the two overlapped plated steel sheets 4 and 5 by a continuous weld.

Figure 2:
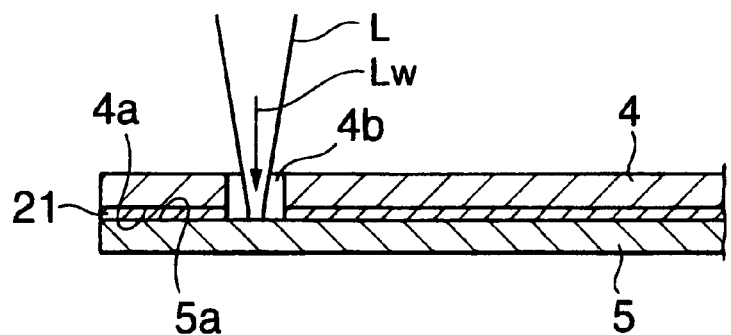
FIG. 2 is an enlarged sectional view of two overlapped plated steel sheets of assistance in explaining a step of forming slits in parts of the plated steel sheet extending on a weld line included in the laser lap welding process in the first embodiment.
Figure 3:
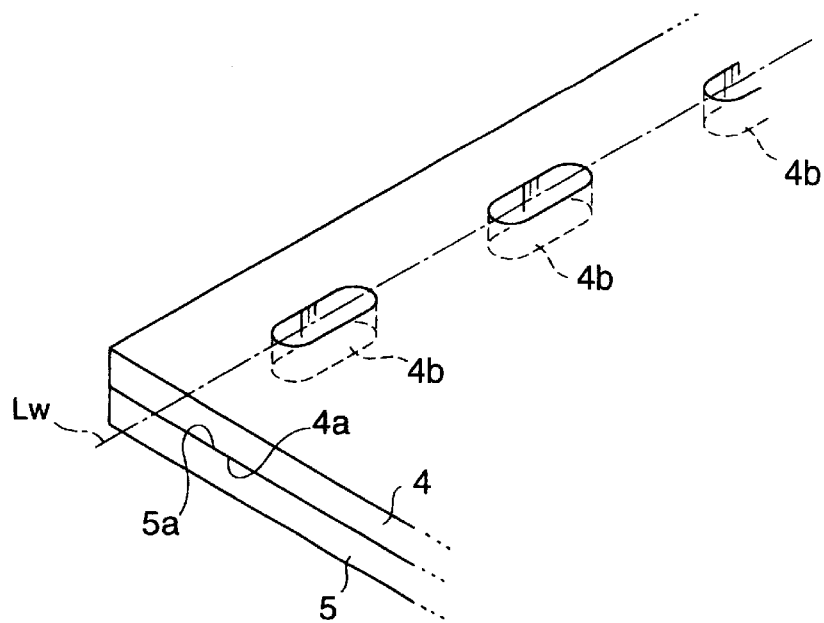
FIG. 3 is a perspective view of two overlapped plated steel sheets provided with slits by the step illustrated in FIG. 2.

As shown in FIG. 3, slits 4b are formed intermittently in parts of the upper plated steel sheet 4 extending on the weld line Lw. The slits 4b are formed by irradiation with the laser beam L as shown in FIG. 2. In FIG. 2, indicated at 21 are coating layers, such as zinc layers, formed on surfaces of the plated steel sheets 4 and 5. Although only the coating layers 21 formed on joining surfaces 4a and 5a are shown in FIG. 2, the plated steel sheets 4 and 5 are coated entirely with the coating layers 21.

Figure 4:
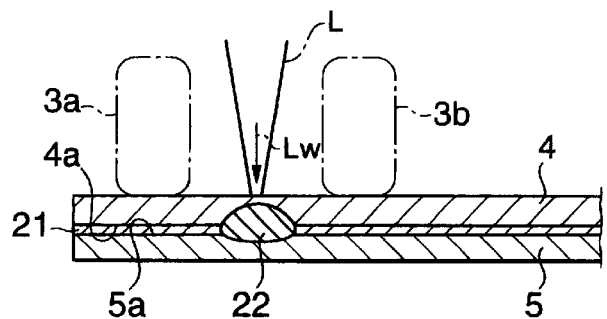
FIG. 4 is an enlarged sectional view of two overlapped plated steel sheets of assistance in explaining a step of laser-welding parts extending on a weld line and not provided with the slits, included in the laser lap welding process in the first embodiment.

Parts of the upper plated steel sheet 4 extending on the weld line Lw and not provided with the slits 4b are irradiated with a laser beam L is project as shown in FIG. 4 for laser lap welding. In FIG. 4, indicated at 21 are the coating layers formed, as previously mentioned in connection with FIG. 2, on the joining surfaces of the plated steel sheets 4 and 5, and at 22 is a bead formed by laser lap welding.

Figure 5:
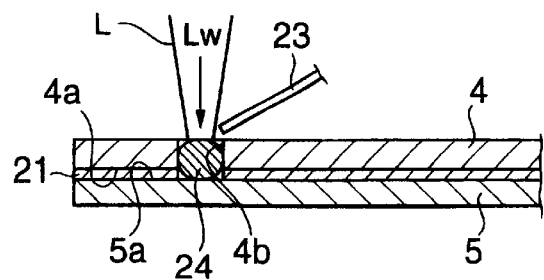
FIG. 5 is an enlarged sectional view of two overlapped plated steel sheets of assistance in explaining a step of filling the slits of the plated steel sheet with a molten metal to stop the slits, included in the laser lap welding process in the first embodiment.

Finally, the slits 4b formed in the upper plated steel sheet 4 are stopped with a molten metal 24 as shown in FIG. 5.

The operation of the laser lap welding process in the first embodiment will be described hereinafter. The two plated steel sheets 4 and 5 are overlapped with the joining surfaces 4a and 5a thereof in contact with each other. Prior to the step of laser lap welding, in which parts of the upper plated steel sheet 4 extending on the weld line Lw is irradiated with the laser beam L emitted by the weld head 1, the slits 4b are formed intermittently in the upper plated steel sheet 4 by irradiating the upper plated steel sheet 4 with the laser beam L as shown in FIGS. 2 and 3. While the slits 4b are being thus formed in the upper plated steel sheet 4, the coating layer 21 of the lower plated steel sheet 5 exposed through the slits 4b of the upper plated steel sheet 4 is vaporized and removed by heat produced by the laser beam L.

Subsequently, the welding head 1 is moved along the weld line Lw while the upper plated steel sheet 4 is pressed against the lower plated steel sheet 5 by the pressure rollers 3a and 3b. The parts of the upper plated steel sheet 4 extending on the weld line Lw and not provided with the slits 4b are irradiated with the laser beam L to laser-weld the plated steel sheets 4 and 5 together as shown in FIG. 4. The vapor of the component of the coating layers 21 produced from the coating layers 21 by the heat produced by the laser beam L is discharged through the slits 4b.

After thus laser-welding together the plated steel sheets 4 and 5, the slits 4b of the upper plated steel sheet 4 are stopped with a molten metal 24 produced by melting a filler wire 23 with the laser beam L as shown in FIG. 5. Since parts of the coating layer 21 coating the lower plated steel sheet 5, exposed in the slits 4b of the upper plated steel sheet 4 are removed during the step of forming the slits 4b, weld defects are not formed at all in the weld.

Thus, the laser lap welding process in the first embodiment forms the slits 4b intermittently in the parts of the upper plated steel sheet 4 extending on the weld line Lw and irradiates the parts extending on the weld line Lw and not provided with the slits 4b with the laser beam L to laser-weld the plated steel sheets 4 and 5 together. Accordingly, the vapor of the component of the coating layers 21 coating the joining surfaces 4a and 5a of the plated steel sheets 4 and 5 produced from the coating layers 21 is discharged outside through the slits 4b of the upper plated steel sheet 4. Consequently, the vapor does not remain in the bead 22 formed by laser lap welding, the formation of weld defects including blow holes and pits can be avoided and the plated steel sheets 4 and 5 can be welded together in a stable weld quality. Since any special gas discharge passage does not need to be formed between the joining surfaces 4a and 5a of the plated steel sheets 4 and 5, work for laser lap welding is simplified. Weld quality is not affected by the shapes of the joining surfaces 4a and 5a of the plated steel sheets 4 and 5 because the joining surfaces 4a and 5a of the plated steel sheets 4 and 5 are kept in close contact with each other, the plated steel sheets 4 and 5 can be welded together in a stable weld quality and production efficiency can be improved.

Since the laser lap welding process in the first embodiment removes the parts of the coating layer 21 coating the lower plated steel sheet 5, exposed in the slits 4b of the upper plated steel sheet 4 by the heat produced by the laser beam L during the formation of the slits 4b in the upper Since parts of the coating layer 21 coating the lower plated steel sheet 5, exposed in the slits 4b of the upper plated steel sheet 4 are removed during the step of forming the slits 4b, weld defects are not formed at all in the weld when stopping the slits 4b of the upper steel sheet 4 with the molten metal 24 produced by melting the filler wire 23 with the laser beam L.

The laser lap welding process in the first embodiment stops the slits 4b of the upper plated steel sheet 4 with the molten metal 24 produced by melting the filler wire 23 with the laser beam L. Thus, the upper plated steel sheet 4 can be finally restored to its original appearance in an initial state where the slits 4b are not formed.

Since the slits 4b of the upper plated steel sheet 4 are formed by using the laser beam L that is used for laser-welding the plated steel sheets 4 and 5 together, any special device for forming the slits 4b is unnecessary and work for the laser lap welding is simplified.

Second Embodiment

A laser lap welding process in a second embodiment of the present invention will be described with reference to FIGS. 6 to 11.

(First Example)

A laser lap welding process in a first example of the laser lap welding process in the second embodiment will be described with reference to FIGS. 6 and 7.

Figure 6:
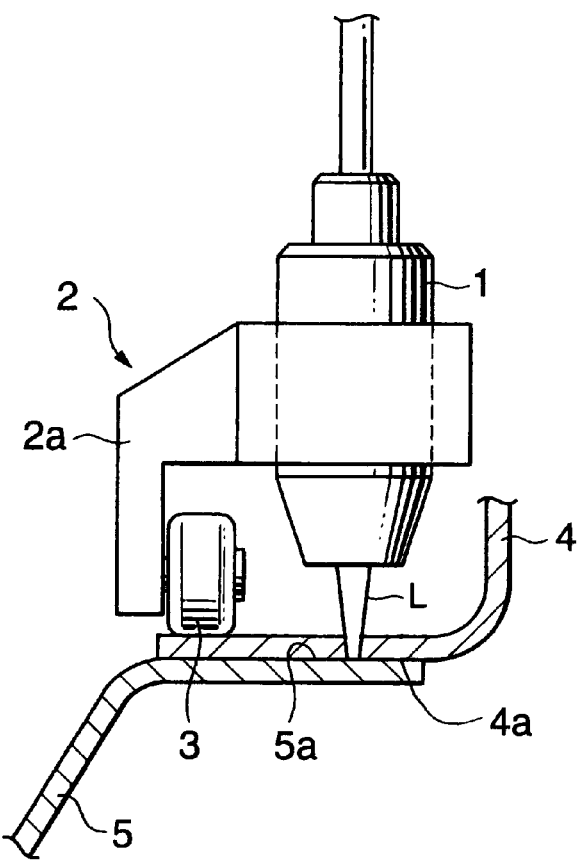
FIG. 6 is an enlarged front elevation of the welding head of a laser lap welder employed in carrying out a laser lap welding process in a second embodiment of the present invention.

FIG. 6 is a view of assistance in explaining a laser lap welder employed in carrying out a laser lap welding process in a second embodiment according to the present invention. Referring to FIG. 6, the laser lap welder has a welding head 1 and a carriage 2 fixed to the welding head 1. Two plated steel sheets 4 and 5 are overlapped. The carriage 2 has a support leg 2a extending vertically downward from a body fixed to the welding head 1. A pressure roller 3 is supported for rotation on a lower end part of the support leg 2a. The pressure roller 3 presses a part of the upper plated steel sheet 4 near a part of the same to be irradiated with a laser beam.

The welding head 1 is held on a robot arm, not shown, or the like and is moved along a weld line Lw on the two overlapped plated steel sheets 4 and 5 by the robot arm. The pressure roller 3 presses a part of the upper plated steel sheet 4 near a part extending on the weld line Lw against the corresponding part of the lower plated steel sheet 5 while the welding head 1 is moved along the weld line Lw. The welding head 1 emits a laser beam L through its lower end on the weld line Lw to weld together the two overlapped plated steel sheets 4 and 5 by a continuous weld.

Figure 7:
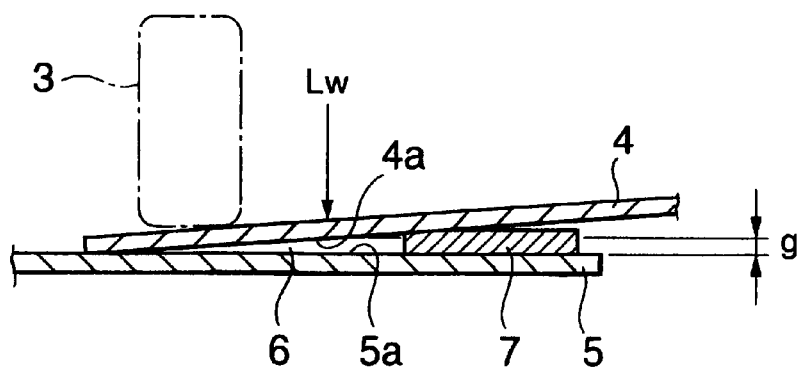
FIG. 7 is an enlarged sectional view of two overlapped plated steel sheets of assistance in explaining a first example of the laser lap welding process in the second embodiment.

As shown in FIG. 7, the pressure roller 3 presses a side edge part of the upper plated steel sheet 4, and a spacer 7 (insert) having the shape of a flat plate is inserted between a side edge part of the lower plated steel sheet 5 and the upper plated steel sheet 4 on the side opposite the side edge part of the upper plated steel sheet 4 pressed by the pressure roller 3 with respect to the weld line Lw. Since the side edge part of the upper plated steel sheet 4 is pressed by the pressure roller 3 and the spacer 7 is inserted between the side edge part of the lower plated steel sheet 5 and the upper plated steel sheet 4, the joining surface 4a of the upper plated steel sheet 4 is inclined to the joining surface 5a of the lower plated steel sheet 5 and a gas discharge passage 6 of a triangular cross section is formed between the joining surfaces 4a and 5a of the plated steel sheets 4 and 5. The position and the height of the spacer 7 is determined so that a part of the gas discharge passage 6 corresponding to the weld line Lw has an appropriate height g in the range of, for example, 0.1 to 0.4 mm. A plurality of spacers 7 may be inserted between the joining surfaces 4a and 5a of the plated steel sheets 4 and 5 at intervals.

The operation of the laser lap welding process in the first example of the second embodiment will be described hereinafter. The two plated steel sheets 4 and 5 are overlapped with the joining surfaces 4a and 5a thereof in contact with each other and the spacer 7 is inserted properly between the joining surfaces 4a and 5a of the plated steel sheets 4 and 5.

Then, the side edge part of the upper plated steel sheet 4 is depressed by the pressure roller 3. The joining surface 4a of the upper plated steel sheet 4 is inclined as shown in FIG. 7 to form the gas discharge passage 6 of a triangular cross section between the joining surfaces 4a and 5a of the plated steel sheets 4 and 5.

Subsequently, the welding head 1 is moved along the weld line Lw while the upper plated steel sheet 4 is pressed against the lower plated steel sheet 5 by the pressure roller 3. A part of the upper plated steel sheet 4 extending on the weld line Lw is irradiated with a laser beam L emitted by the welding head 1 to laser-weld the plated steel sheets 4 and 5 together. The vapor of the component of the coating layers, such as zinc layers, produced from the coating layers by the heat produced by the laser beam L is discharged outside through the gas discharge passage 6.

Thus, the laser lap welding process in the first example of the second embodiment inserts the spacer 7 between the joining surfaces 4a and 5a of the overlapped plated steel sheets 4 and 5 to form the gas discharge passage 6 around the weld line Lw, and irradiates the parts of the plated steel sheets 4 and 5 extending on the weld line Lw with the laser beam L to weld together the plated steel sheets 4 and 5 by laser lap welding. Since the vapor of the component of the coating layers coating the joining surfaces 4a and 5a of the plated steel sheets 4 and 5 can be discharged outside through the gas discharge passage 6, the vapor does not remain in a bead formed by laser lap welding, the formation of weld defects including blow holes and pits can be avoided and the plated steel sheets 4 and 5 can be welded together in a stable weld quality. Since the gas discharge passage 6 is formed simply by inserting the spacer 7 between the plated steel sheets 4 and 5, any special process is not necessary for forming the gas discharge passage 6 between the plated steel sheets 4 and 5 and work for laser lap welding can be simplified. Since the height g of the part of the gas discharge passage 6 corresponding to the weld line Lw is determined by the position of the spacer 7 in the space between the plated steel sheets 4 and 5 and the thickness of the same, laser lap welding can be carried out with the height g properly maintained, the height g can be easily managed, the plated steel sheets 4 and 5 can be welded together in a stable weld quality and production efficiency can be improved.

(Second Example)

Figure 8:
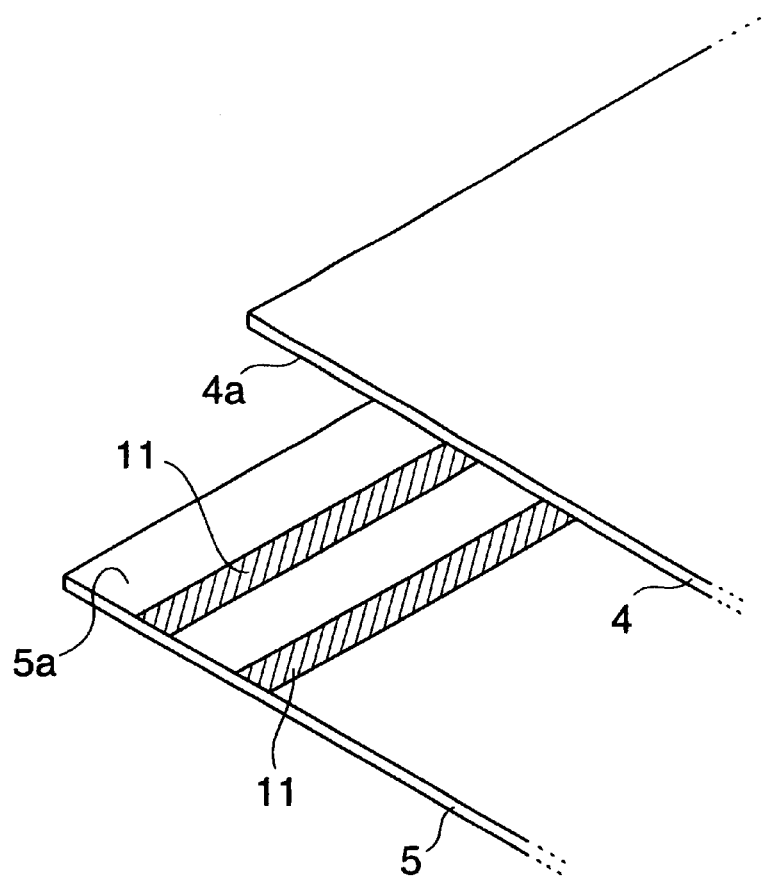
FIG. 8 is a perspective view of two overlapped plated steel sheets of assistance in explaining a second example of the laser lap welding process in the second embodiment.
Figure 9:
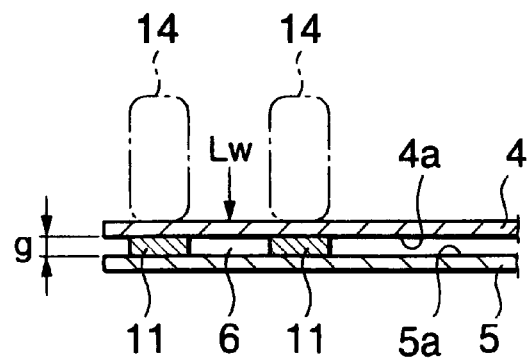
FIG. 9 is an enlarged sectional view of two overlapped plated steel sheets of assistance in explaining the second example of the laser lap welding process in the second embodiment.
Figure 10:
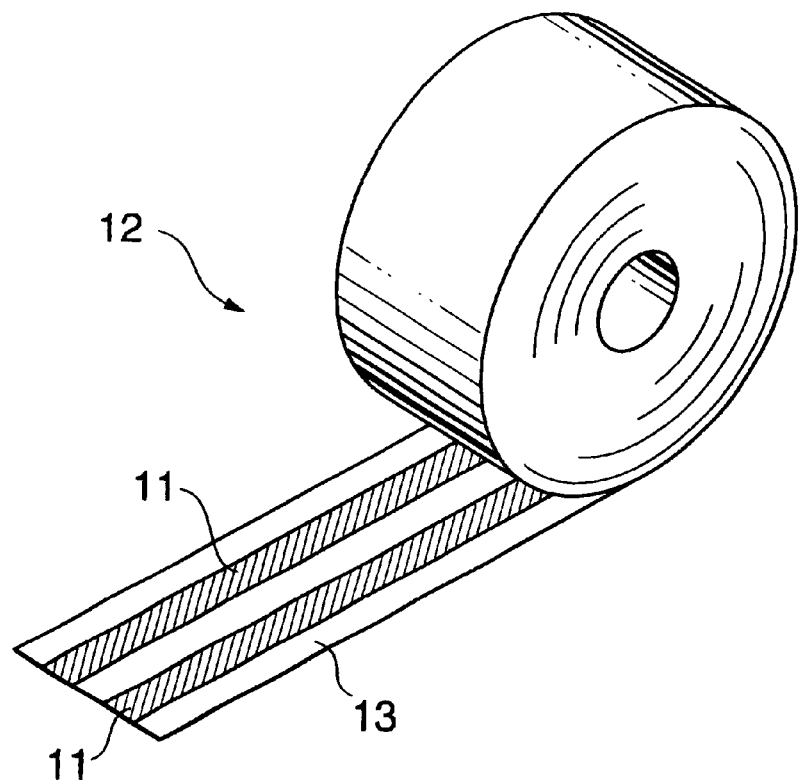
FIG. 10 is a perspective view of a roll of adhesive tapes to be used by the second example of the laser lap welding process in the second embodiment.

A laser lap welding process in a second example of the laser lap welding process in the second embodiment will be described with reference to FIGS. 8 to 10. The second example is identical with the first example previously described with reference to FIGS. 6 and 7, except that the second example uses adhesive members (members indicated at 11 in FIGS. 8 and 9) as inserts inserted between the joining surfaces of plated steel sheets and employs a laser lap welder provided with pressure rollers (rollers 14 in FIG. 9) disposed on the opposite sides of a welding head. In FIGS. 8 to 10, parts like or corresponding to those shown in FIGS. 6 and 7 are denoted by the same reference characters and the description thereof will be omitted.

Referring to FIGS. 8 and 9, adhesive tapes 11 are sandwiched between parts of the joining surfaces 4a and 5a of plated steel sheets 4 and 5 extending near and on the opposite sides of a weld line Lw, respectively. The adhesive tapes 11 are separated from a release paper sheet 13 rolled in an adhesive tape roll 12 and are attached to the joining surface 5a of the lower plated steel sheet 5. As shown in FIG. 10, the adhesive tape roll 12 is formed by rolling the release paper sheet 13 holding the adhesive tapes 11 in two lines spaced a predetermined distance apart. Each adhesive tape 11 is a somewhat elastic three-layer structure including a base tape and adhesive layers formed on the opposite surfaces of the base tape.

As shown in FIG. 9, the two adhesive tapes 11 are sandwiched between the joining surfaces 4a and 5a of the plated steel sheets 4 and 5 so as to extend on the opposite sides of the weld line Lw, respectively, to form a gas discharge passage 6 of a rectangular cross section. The pressure rollers 14 apply pressure to parts of the upper plated steel sheet 4 corresponding to the adhesive tapes 11. The pressure applied to the upper plated steel sheet 4 by the pressure rollers 14 is adjusted so that the gas discharge passage 6 has an appropriate height g in the range of, for example, 0.1 to 0.4 mm.

The operation of the laser lap welding process in the second example of the second embodiment will be described hereinafter. The plated steel sheets 4 and 5 are formed in predetermined shapes, respectively, by press working or the like. The adhesive tapes 11 are attached to the joining surface 5a of the lower plated steel sheet 5 by unwinding the release paper sheet 12 holding the adhesive tapes 11 from the adhesive tape roll 12, extending the release paper sheet 13 on the joining surface 5a of the lower plated steel sheet 5 so that the adhesive tapes 11 extend near and on the opposite sides of the weld line Lw, respectively, and peeling the release paper sheet 13 from the adhesive tapes 11. Then the upper plated steel sheet 4 is put on the lower plated steel sheet 5 so that the joining surface 4a of the upper plated steel sheet 4 faces the joining surface 5a of the lower plated steel sheet 5.

When the pressure rollers 14 apply pressure to the parts of the upper plated steel sheet 4 corresponding to the adhesive tapes 11 in this state, the gas discharge passage 6 of the rectangular cross section is formed between the joining surfaces 4a and 5a.

Subsequently, the welding head 1 is moved along the weld line Lw while the upper plated steel sheet 4 is pressed against the lower plated steel sheet 5 by the pressure rollers 14 with a pressure force such that the gas discharge passage 6 has an appropriate height g in the range of, for example, 0.1 to 0.4 mm. A part of the upper plated steel sheet 4 extending on the weld line Lw is irradiated with a laser beam L emitted by the welding head 1 to laser-weld the plated steel sheets 4 and 5 together. The vapor of the component of the coating layers, such as zinc layers, produced from the coating layers by the heat produced by the laser beam L is discharged outside through the gas discharge passage 6.

Thus, the laser lap welding process in the second example of the second embodiment sandwiches the adhesive tapes 11 between the joining surfaces 4a and 5a of the overlapped plated steel sheets 4 and 5 to form the gas discharge passage 6 around the weld line Lw, and irradiates the parts of the plated steel sheets 4 and 5 extending on the weld line Lw with the laser beam L to weld together the plated steel sheets 4 and 5 by laser lap welding. Since the vapor of the component of the coating layers coating the joining surfaces 4a and 5a of the plated steel sheets 4 and 5 can be discharged outside through the gas discharge passage 6, the vapor does not remain in a bead formed by laser lap welding, the formation of weld defects including blow holes and pits can be avoided and the plated steel sheets 4 and 5 can be welded together in a stable weld quality. Since the gas discharge passage 6 is formed simply by sandwiching the adhesive tapes 11 between the plated steel sheets 4 and 5, any special process is not necessary for forming the gas discharge passage 6 between the plated steel sheets 4 and 5 and work for laser lap welding can be simplified. Since the height g of the part of the gas discharge passage 6 corresponding to the weld line Lw is determined by the pressure applied to the upper plated steel sheet 4 by the pressure rollers 14, laser lap welding can be carried out with the height g properly maintained, the height g can be easily managed, the plated steel sheets 4 and 5 can be welded together in a stable weld quality and production efficiency can be improved.

Since the second example of the second embodiment attaches the adhesive tapes 11 to the joining surface 5a of the lower plated steel sheet 5 while the adhesive tapes 11 are by continuously separated from the release paper sheet 13 unwound from the adhesive tape roll 12, a process for attaching the adhesive tapes 11 to the lower plated steel sheet 5 can be automated, which further improves production efficiency.

(Third Example)

Figure 11:
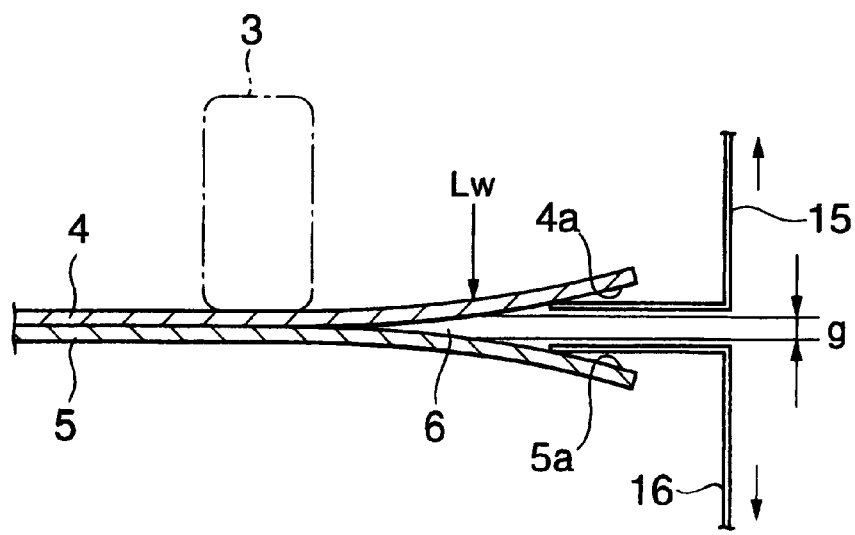
FIG. 11 is a perspective view of two overlapped plated steel sheets of assistance in explaining a third example of the laser lap welding process in the second embodiment.

A laser lap welding process in a third example of the second embodiment will be described with reference to FIG. 11. The third example is substantially similar to the first example previously described with reference to FIGS. 6 and 7, except that the third example uses a pair of L-shaped brackets. In FIG. 11 parts like or corresponding to those shown in FIGS. 6 and 7 are denoted by the same reference characters and the description thereof will be omitted.

Referring to FIG. 11, plated steel sheets 4 and 5 are overlapped. A pressure roller 3 depresses a side edge part of the upper plated steel sheet 4. Spacing parts of a pair of L-shaped brackets 15 and 16 are inserted between the other side edge parts of the plated steel sheets 4 and 5, opposite the pressure roller 3 with respect to a weld line Lw so that parts of the joining surfaces 4a and 5a of the plated steel sheets 4 and 5 are spaced apart from each other so as to form a gas discharge passage 6 between the joining surfaces 4a and 5a of the plated steel sheets 4 and 5. The spacing parts of the L-shaped brackets 15 and 16 are inserted between the joining surfaces 4a and 5a by a proper depth and are spaced a proper distance apart from each other so that a part of the gas discharge passage 6 corresponding to the weld line Lw has an appropriate height g in the range of, for example, 0.1 to 0.4 mm.

The operation of the laser lap welding process in the third example of the second embodiment will be described hereinafter. The two plated steel sheets 4 and 5 formed in predetermined shapes, respectively, by press working or the like are overlapped and the spacing parts of the pair of L-shaped brackets 15 and 16 are inserted between the joining surfaces 4a and 5a of the plated steel sheets 4 and 5.

Then, the side edge part of the upper plated steel sheet 4 is depressed by the pressure roller 3 and the pair of L-shaped brackets 15 and 16 are moved vertically in opposite directions, respectively, by a moving mechanism, not shown, to space parts of the joining surfaces 4a and 5a near the spacing parts of the L-shaped brackets 15 and 16 from each other, so that the gas discharge passage 6 is formed. Since the plated steel sheets 4 and 5 are pressed firmly against the spacing parts of the L-shaped brackets 15 and 16 by their own resilience, the part of the gas discharge passage 6 corresponding to the weld line Lw is kept in the appropriate height g. The L-shaped brackets 15 and 16 are separated from each other so that the height g of the part of the gas discharge passage 6 corresponding to the weld line Lw is in the range of, for example, 0.1 to 0.4 mm.

Subsequently, the welding head 1 is moved along the weld line Lw while the upper plated steel sheet 4 is pressed against the lower plated steel sheet 5 by the pressure roller 3. A part of the upper plated steel sheet 4 extending on the weld line Lw is irradiated with a laser beam L emitted by the welding head 1 to laser-weld the plated steel sheets 4 and 5 together. The vapor of the component of the coating layers, such as zinc layers, produced from the coating layers by the heat produced by the laser beam L is discharged outside through the gas discharge passage 6. After the plated steel sheets 4 and 5 have been thus welded together, the working parts of the pair of L-shaped brackets 15 and 16 are removed from the space between the side edge parts of the plated steel sheets 4 and 5.

Thus, the laser lap welding process in the third example of the second embodiment inserts the spacing parts of the pair of L-shaped brackets 15 and 16 between the side edge parts of the plated steel sheets 4 and 5 so that the parts of the joining surfaces 4a and 5a of the plated steel sheets 4 and 5 are spaced apart from each other to form the gas discharge passage 6 around the weld line Lw, and irradiates the parts of the plated steel sheets 4 and 5 extending on the weld line Lw with the laser beam L to laser-weld together the plated steel sheets 4 and 5. Since the vapor of the component of the coating layers coating the joining surfaces 4a and 5a of the plated steel sheets 4 and 5 can be discharged outside through the gas discharge passage 6, the vapor does not remain in a bead formed by laser lap welding, the formation of weld defects including blow holes and pits can be avoided and the plated steel sheets 4 and 5 can be welded together in a stable weld quality. Since the gas discharge passage 6 is formed simply by inserting the spacing parts of the L-shaped brackets 15 and 16 between the plated steel sheets 4 and 5, any special process is not necessary for forming the gas discharge passage 6 between the plated steel sheets 4 and 5 and work for laser lap welding can be simplified. Since the plated steel sheets 4 and 5 are pressed firmly against the spacing parts of the L-shaped brackets 15 and 16 by their own resilience, the part of the gas discharge passage 6 corresponding to the weld line Lw can be kept in the appropriate height g during laser lap welding. Thus, the height g can be easily managed, the plated steel sheets 4 and 5 can be welded together in a stable weld quality and production efficiency can be improved.

Third Embodiment

A laser lap welding process in a third embodiment of the present invention will be described with reference to FIGS. 12 to 17.

(First Example)

A laser lap welding process in a first example of the third embodiment will be described with reference to FIGS. 12 to 14.

Figure 12:
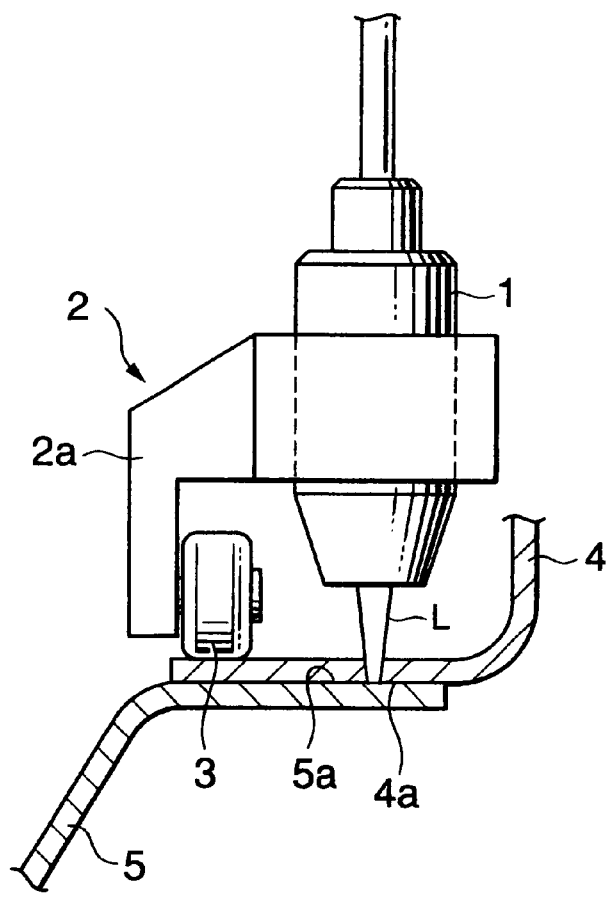
FIG. 12 is an enlarged front elevation of the welding head of a laser lap welder employed in carrying out a laser lap welding process in a third embodiment of the present invention.

FIG. 12 is a view of assistance in explaining a laser lap welder employed in carrying out the third embodiment of the present invention. Referring to FIG. 12, the laser lap welder has a welding head 1 and a carriage 2 fixed to the welding head 1. Two plated steel sheets 4 and 5 are overlapped. The carriage 2 has a support leg 2a extending vertically downward from a body fixed to the welding head 1. A pressure roller 3 is supported for rotation on a lower end part of the support leg 2a. The pressure roller 3 presses a part of the upper plated steel sheet 4 near a part of the same to be irradiated with a laser beam.

The welding head 1 is held on a robot arm, not shown, or the like and is moved along a weld line Lw on the two overlapped plated steel sheets 4 and 5 by the robot arm. The pressure roller 3 presses a part of the upper plated steel sheet 4 near a part extending on the weld line Lw against the corresponding part of the lower plated steel sheet 5 while the welding head 1 is moved along the weld line Lw. The welding head 1 emits a laser beam L through its lower end on the weld line Lw to weld together the two overlapped plated steel sheets 4 and 5 by a continuous weld.

Figure 13:
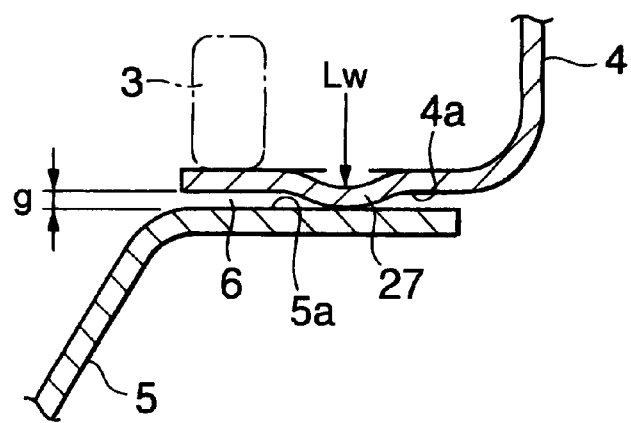
FIG. 13 is an enlarged sectional view of two overlapped plated steel sheets of assistance in explaining a first example of the laser lap welding process in the third embodiment.

As shown in FIG. 13, parts of the upper plated steel sheet 4 extending on the weld line Lw are embossed to form bosses 27 protruding toward the lower plated steel sheet 5. The bosses 27 keep the joining surface 4a of the upper plated steel sheet 4 and the joining surface 5a of the lower plated steel sheet 5 spaced to form a gas discharge passage 6. A side edge part of the upper plated steel sheet 4 is depressed properly by the pressure roller 3 so that the gas discharge passage 6 has a proper height g of, for example, 0.2±0.1 mm. The bosses 27 are formed at least in parts of the upper plated steel sheet 4 corresponding to the opposite ends of the weld line Lw. When weld length is long, the bosses 27 are formed in a part of the upper plated steel sheet 4 extending on the weld line Lw at predetermined intervals. The number and positions of the bosses 27 are determined properly taking into consideration conditions including the thickness of the plated steel sheets 4 and 5.

The operation of the laser lap welding process in the first example of the third embodiment will be described hereinafter. The two plated steel sheets 4 and 5 formed in predetermined shapes, respectively, by press working or the like are overlapped. The upper plated steel sheet 4 is provided with the bosses 27.

Then, the side edge part of the upper plated steel sheet 4 is depressed by the pressure roller 3 to space the respective joining surfaces 4a and 5a of the plated steel sheets 4 and 5 from each other by the bosses 27, so that the gas discharge passage 6 is formed.

Subsequently, the welding head 1 is moved along the weld line Lw while the upper plated steel sheet 4 is pressed against the lower plated steel sheet 5 by the pressure roller 3. A part of the upper plated steel sheet 4 extending on the weld line Lw is irradiated with a laser beam L emitted by the welding head 1 to laser-weld the plated steel sheets 4 and 5 together. The vapor of the component of the coating layers, such as zinc layers, produced from the coating layers by the heat produced by the laser beam L is discharged outside through the gas discharge passage 6.

Thus, the laser lap welding process in the first example of the third embodiment spaces the respective joining surfaces 4a and 5a of the plated steel sheets 4 and 5 from each other by the bosses 27 formed in the upper plated steel sheet 4 to form the gas discharge passage 6, and irradiates the parts of the plated steel sheets 4 and 5 extending on the weld line Lw with the laser beam L to laser-weld together the plated steel sheets 4 and 5. Since the vapor of the component of the coating layers coating the joining surfaces 4a and 5a of the plated steel sheets 4 and 5 can be discharged outside through the gas discharge passage 6, the vapor does not remain in a bead formed by laser lap welding, the formation of weld defects including blow holes and pits can be avoided and the plated steel sheets 4 and 5 can be welded together in a stable weld quality. Since the gas discharge passage 6 is held by the bosses 27, any special process is not necessary for forming the gas discharge passage 6 between the plated steel sheets 4 and 5 and work for laser lap welding can be simplified. The gas discharge passage 6 can be kept in the appropriate height g by the bosses 27 during laser lap welding. Thus, the height g can be easily managed, the plated steel sheets 4 and 5 can be welded together in a stable weld quality and production efficiency can be improved.

Figure 14:
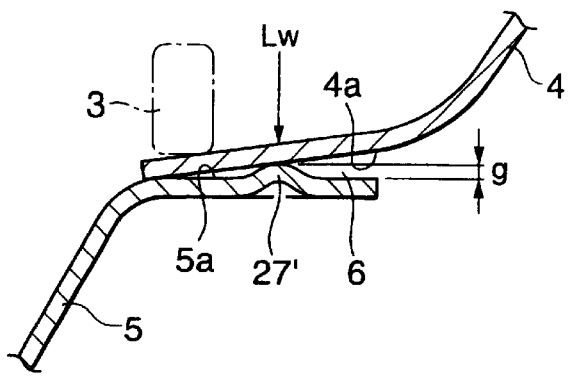
FIG. 14 is an enlarged sectional view of two overlapped plated steel sheets of assistance in explaining a modification of the first example of the laser lap welding process in the third embodiment.

Although the first example of the third embodiment described with reference to FIG. 13 forms the bosses 27 in the upper plated steel sheet 4, bosses 27' protruding toward the upper plated steel sheet 4 may be formed in a part of the lower plated steel sheet 5 extending on the weld line Lw as shown in FIG. 14.

(Second Example)

Figure 15:
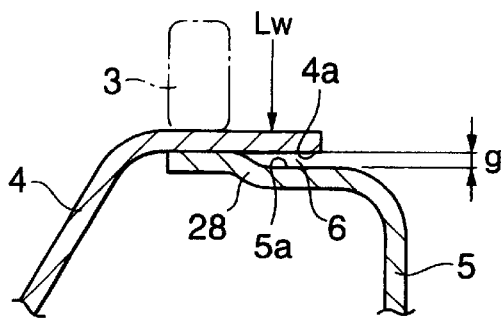
FIG. 15 is an enlarged sectional view of two overlapped plated steel sheets of assistance in explaining a second example of the laser lap welding process in the third embodiment.

A laser lap welding process in a second example of the third embodiment will be described with reference to FIG. 15. The second example is substantially the same as the first example previously described with reference to FIGS. 12 to 14, except that the second example forms a step (a part indicated at 28 in FIG. 15) in one of two overlapped plated steel sheets to form a gas discharge passage between the respective joining surfaces of the two overlapped plated steel sheets. In FIG. 15, parts like or corresponding to those shown in FIGS. 12 to 14 are denoted by the same reference characters and the description thereof will be omitted.

Referring to FIG. 15, a part of a lower plated steel sheet 5 corresponding to a weld line Lw is bent to form a step 28 to space apart the joining surface 5a of the lower plated steel sheet 5 and the joining surface 4a of an upper plated steel sheet 4 a distance g of, for example, 0.2±0.1 mm to form a gas discharge passage 6 between the joining surfaces 4a and 5a of the plated steel sheets 4 and 5. The step S is formed in a part of the plated steel sheet 5 extending on and in parallel to the weld line Lw so as to extend continuously.

The operation of the laser lap welding process in the second example of the third embodiment will be described hereinafter. The two plated steel sheets 4 and 5 formed in predetermined shapes, respectively, by press working or the like are overlapped with the respective joining surfaces 4a and 5a thereof facing each other. The lower plated steel sheet 5 is provided with the step 28. The respective joining surfaces 4a and 5a are spaced apart by the step 28 formed in the lower plated steel sheet 5 to form the gas discharge passage 6.

Then, the welding head 1 is moved along the weld line Lw while the upper plated steel sheet 4 is pressed against the lower plated steel sheet 5 by the pressure roller 3. A part of the upper plated steel sheet 4 extending on the weld line Lw is irradiated with a laser beam L emitted by the welding head 1 to laser-weld the plated steel sheets 4 and 5 together. The vapor of the component of the coating layers, such as zinc layers, produced from the coating layers by the heat produced by the laser beam L is discharged outside through the gas discharge passage 6.

Thus, the laser lap welding process in the second example of the third embodiment spaces the respective joining surfaces 4a and 5a of the plated steel sheets 4 and 5 from each other by the step 28 formed in the lower plated steel sheet 5 to form the gas discharge passage 6 near the weld line Lw, and irradiates the parts of the plated steel sheets 4 and 5 extending on the weld line Lw with the laser beam L to laser-weld together the plated steel sheets 4 and 5. Since the vapor of the component of the coating layers coating the joining surfaces 4a and 5a of the plated steel sheets 4 and 5 can be discharged outside through the gas discharge passage 6, the vapor does not remain in a bead formed by laser lap welding, the formation of weld defects including blow holes and pits can be avoided and the plated steel sheets 4 and 5 can be welded together in a stable weld quality. Since the gas discharge passage 6 is held by the step 28, any special process is not necessary for forming the gas discharge passage 6 between the plated steel sheets 4 and 5 and work for laser lap welding can be simplified. The gas discharge passage 6 can be kept in the appropriate height by the step 28 during laser lap welding. Thus, the height g can be easily managed, the plated steel sheets 4 and 5 can be welded together in a stable weld quality and production efficiency can be improved. Although the second example described with reference to FIG. 15 forms the step 28 in the lower plated steel sheet 5, a step may be formed by bending a part of the upper plated steel sheet 4 extending on the weld line Lw so as to space the upper plated steel sheet 4 a predetermined distance apart from the lower plated steel sheet 5.

(Third Example)

Figure 16:
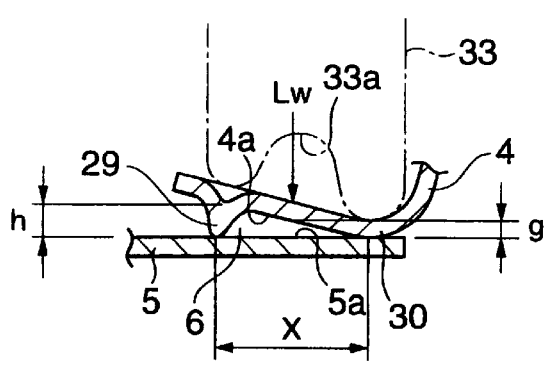
FIG. 16 is an enlarged sectional view of two overlapped plated steel sheets of assistance in explaining a third example of the laser lap welding process in the third embodiment.

A laser lap welding process in a third example of the third embodiment will be described with reference to FIG. 16. The third example is substantially the same as the first example previously described with reference to FIGS. 12 to 14, except that the third example forms a gas discharge passage of a triangular cross section by a protrusion (a part indicated at 29 in FIG. 16) formed in a plated steel sheet. In FIG. 16 parts like or corresponding to those shown in FIGS. 12 to 14 are denoted by the same reference characters and the description thereof will be omitted.

Referring to FIG. 16, an upper plated steel sheet 4 has a bent base part 30 and a side edge part provided with protrusions 29 protruding toward a lower plated steel sheet 5 and extending in parallel to a weld line Lw. A pressure roller 33 is provided with an annular groove 33a. The pressure roller 33 is applied to the upper plated steel sheet 4 with the annular groove 33a corresponding to the weld line Lw to press the bent base part 30 and the protrusions 29 of the upper plated steel sheet 4 against the lower plated steel sheet 5. The joining surface 4a of the upper plated steel sheet 4 is tilted on the bent base part 30 by the protrusions 29 relative to the joining surface 5a of the lower plated steel sheet S, so that a gas discharge passage 6 of a triangular cross section is formed between the joining surfaces 4a and 5a of the plated steel sheets 4 and 5. A part of the gas discharge passage 6 corresponding to the weld line Lw has a predetermined height g of, for example, 0.2±0.1 mm. The distance between parts of the lower plated steel sheet 5 in contact with the bent base end 30 and the protrusion 29 of the upper plated steel sheet 4, respectively, is x, and the height of the protrusions 29 is h. The protrusions 29 are formed at least at the opposite ends of a part of the plated steel sheet 4 extending in parallel to the weld line Lw. When weld length is long, the protrusions 29 are formed in a part of the upper plated steel sheet 4 extending in parallel to the weld line Lw at predetermined intervals. The number and positions of the protrusions 29 are determined properly taking into consideration conditions including the thickness of the plated steel sheets 4 and 5.

The operation of the laser lap welding process in the third example of the third embodiment will be described hereinafter. The two plated steel sheets 4 and 5 formed in predetermined shapes, respectively, by press working or the like are overlapped with the respective joining surfaces 4a and 5a thereof facing each other. The upper plated steel sheet 4 is provided with the protrusions 29 and the bent base part 30. The joining surface 4a of the upper plated steel sheet 4 is tilted on the bent base part 30 by the protrusions 29 relative to the joining surface 5a of the lower plated steel sheet 5, so that the gas discharge passage 6 of a triangular cross section is formed between the joining surfaces 4a and 5a of the plated steel sheets 4 and 5.

Then, the welding head 1 is moved along the weld line Lw while the upper plated steel sheet 4 is pressed against the lower plated steel sheet 5 by the pressure roller 33. A part of the gas discharge passage 6 corresponding to the weld line Lw has a predetermined height g of, for example, 0.2±0.1 mm. A part of the upper plated steel sheet 4 extending on the weld line Lw is irradiated with a laser beam L emitted by the welding head 1 to laser-weld the plated steel sheets 4 and 5 together. The vapor of the component of the coating layers, such as zinc layers, produced from the coating layers by the heat produced by the laser beam L is discharged outside mostly through a part of the gas discharge passage 6 near the protrusions 29.

Thus, the laser lap welding process in the second example of the third embodiment spaces the respective joining surfaces 4a and 5a of the plated steel sheets 4 and 5 from each other by tilting the upper plated steel sheet 4 on the bent base end 30 by the protrusions 29 relative to the lower plated steel sheet 5 to form the gas discharge passage 6 of a triangular cross section near the weld line Lw, and irradiates the parts of the plated steel sheets 4 and 5 extending on the weld line Lw with the laser beam L to laser-weld together the plated steel sheets 4 and 5. Since the vapor of the component of the coating layers coating the joining surfaces 4a and 5a of the plated steel sheets 4 and 5 can be discharged outside through the gas discharge passage 6, the vapor does not remain in a bead formed by laser lap welding, the formation of weld defects including blow holes and pits can be avoided and the plated steel sheets 4 and 5 can be welded together in a stable weld quality. Since the gas discharge passage 6 is held by the protrusions 29 and the bend base part 30, any special process is not necessary for forming the gas discharge passage 6 between the plated steel sheets 4 and 5 and work for laser lap welding can be simplified. The part of the gas discharge passage 6 corresponding to the weld line Lw can be kept in the appropriate height g by the protrusions 29 during laser lap welding. Thus, the height g can be easily managed, the plated steel sheets 4 and 5 can be welded together in a stable weld quality and production efficiency can be improved.

(Fourth Example)

Figure 17:
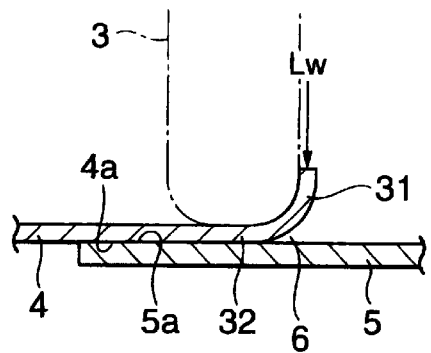
FIG. 17 is an enlarged sectional view of two overlapped plated steel sheets of assistance in explaining a fourth example of the laser lap welding process in the third embodiment.

A laser lap welding process in a fourth example of the third embodiment will be described with reference to FIG. 17. The fourth example is substantially the same as the first example previously described with reference to FIGS. 12 to 14, except that the fourth example forms a gas discharge passage by a flange (a part indicated at 31 in FIG. 17) formed by bending a side edge part of a plated steel sheet. In FIG. 17 parts like or corresponding to those shown in FIGS. 12 to 14 are denoted by the same reference characters and the description thereof will be omitted.

Referring to FIG. 17, an upper plated steel sheet 4 has a flange 31 of a small width formed by bending a side edge part of an upper plated steel sheet 4 away from a lower plated steel sheet 5. A gas discharge passage 6 is defined by the flange 31 and the joining surface 5a of the lower plated steel sheet 5. More concretely, the gas discharge passage 6 is defined by a part of the joining surface 4a of the upper plated steel sheet 4 in a side edge part 32 bent upward to form the flange 31 and the joining surface 5a of the lower plated steel sheet 5. The edge of the flange 31 extends along a weld line Lw. A pressure roller 3 supported for rotation on a carriage 2 fixed to a welding head 1 as shown in FIG. 12 is guided for movement along the weld line Lw by the inner surface of the flange 31. The edge of the flange 31 extends continuously along the weld line Lw.

The operation of the laser lap welding process in the fourth example of the third embodiment will be described hereinafter. The two plated steel sheets 4 and 5 formed in predetermined shapes, respectively, by press working or the like are overlapped with the respective joining surfaces 4a and Sa thereof facing each other. The upper plated steel sheet 4 is provided with the flange 31. The gas discharge passage 6 is defined by the part of the joining surface 4a of the upper plated steel sheet 4 in the side edge part 32 bent upward to form the flange 31 and the joining surface 5a of the lower plated steel sheet 5.

Then, the welding head 1 is moved along the weld line Lw at a speed low enough to melt the flange 31 while the upper plated steel sheet 4 is pressed against the lower plated steel sheet 5 by the pressure roller 3. The part f the upper plated steel sheet 4 extending on the weld line Lw is irradiated with a laser beam L emitted by the welding head 1 to laser-weld together the plated steel sheets 4 and 5. The vapor of the component of the coating layers, such as zinc layers, produced from the coating layers by the heat produced by the laser beam L is discharged outside through the gas discharge passage 6.

Thus, the laser lap welding process in the fourth example of the third embodiment forms the gas discharge passage 6 of a triangular cross section by the respective joining surfaces 4a and 5a of the plated steel sheets 4 and 5 and irradiates the parts of the plated steel sheets 4 and 5 extending on the weld line Lw with the laser beam L to laser-weld together the plated steel sheets 4 and 5. Since the vapor of the component of the coating layers coating the joining surfaces 4a and 5a of the plated steel sheets 4 and 5 can be discharged outside through the gas discharge passage 6, the vapor does not remain in a bead formed by laser lap welding, the formation of weld defects including blow holes and pits can be avoided and the plated steel sheets 4 and 5 can be welded together in a stable weld quality. Since the gas discharge passage 6 is formed by forming the flange 31 in the upper plated steel sheet 4, any special bracket is not necessary for forming the gas discharge passage 6 and work for laser lap welding can be simplified. The gas discharge passage 6 can be formed so that a part thereof corresponding to the weld line Lw has an appropriate height by properly bending the side edge part of the upper plated steel sheet in forming the flange 31. The rigidity of the flange 31 is enhanced by work hardening when the flange 31 is formed by bending the side edge part of the upper plated steel sheet 4. Thus, the part of the gas discharge passage 6 corresponding to the weld line Lw can be kept in the appropriate height during laser lap welding, the height can be easily managed, the plated steel sheets 4 and 5 can be welded together in a stable weld quality and production efficiency can be improved.

The fourth example of the third embodiment uses the inner surface of the flange 31 as a guide for guiding the pressure roller 3 that moves together with the welding head 1. Therefore, the welding head 1 can be accurately moved along the weld line Lw corresponding to the upper edge of the flange 31.

What is claimed is:

1. A laser lap welding process of welding together overlapped first and second plated steel sheets, comprising the steps of:
    forming slits intermittently in the first plated steel sheet to be irradiated with a laser beam along a weld line, so as to expose the second plated steel sheet to the outside through the slits; and
    irradiating parts of the first plated steel sheet extending on the weld line and not provided with the slits with a laser beam to weld together the first and second plated steel sheets.

2. The laser lap welding process according to claim 1, further comprising the step of removing parts of the coating layer of the second plated steel sheet respectively corresponding to the slits formed in the first plated steel sheet.

3. The laser lap welding process according to claim 1, further comprising the step of stopping the slits of the first plated steel sheet by filling the slits with a molten metal and irradiating the molten metal with a laser beam after welding together the first and second plated steel sheets.

4. The laser lap welding process according to claim 1, wherein the slits are formed by irradiating parts of the first plated steel sheet extending on the weld line with a laser beam.

5. A laser lap welding process of welding together overlapped first and second plated steel sheets, comprising the steps of:

inserting inserts between joining surfaces of the first plated steel sheet and the second plated steel sheet to form a gas discharge passage between parts of the first and second plated steel sheets around a weld line, wherein the inserts are adhesive members attached to the parts of the first and second plated steel sheets near the weld line; and irradiating parts of the first and second plated steel sheets extending on the weld line with a laser beam to weld together the first and second plated steel sheets.

6. The laser lap welding process according to claim 5, further comprising the step of pressing the parts of the first and second plated steel sheets to which the adhesive members are attached by pressure rollers so that the gas discharge passage is formed in a predetermined height between the joining surfaces of the first and second plated steel sheets.

7. The laser lap welding process according to claim 6, wherein the adhesive members are placed on parts of the first and second plated steel sheets extending on the opposite sides of the weld line.

8. The laser lap welding process according to claim 6, wherein the adhesive members are separated from a release paper sheet unwound from a release paper sheet roll and are attached to the joining surface of either of the first and second plated steel sheets.

9. The laser lap welding process according to claim 7, wherein the adhesive members are separated from a release paper sheet unwound from a release paper sheet roll and are attached to the joining surface of either of the first and second plated steel sheets.

10. A laser lap welding process of welding together overlapped first and second plated steel sheets, comprising the steps of:

partly deforming at least either of the first and second plated steel sheets so that a space is formed between joining surfaces of the first and second plated steel sheets when the first and second plated steel sheets are joined, to form a gas discharge passage between parts of the first and second plated steel sheets near a weld line; and irradiating parts of the first and second plated steel sheets extending on the weld line with a laser beam to weld together the first and second plated steel sheets;

wherein the gas discharge passage is formed by partly spacing the respective joining surfaces of the first and second plated steel sheets by a flange having a curved bend formed in either of the first and second plated steel sheets.

11. A laser lap welding process of welding together overlapped first and second plated steel sheets, comprising the steps of:

partly deforming at least either of the first and second plated steel sheets so that a space is formed between joining surfaces of the first and second plated steel sheets when the first and second plated steel sheets are joined, to form a gas discharge passage between parts of the first and second plated steel sheets near a weld line; and irradiating parts of the first and second plated steel sheets extending on the weld line with a laser beam to weld together the first and second plated steel sheets;

wherein the gas discharge passage is formed by spacing apart the joining surfaces of the first and second plated steel sheets by protrusions formed in either of the first and second plated steel sheets;

wherein the first and second plated steel sheets are spaced apart from each other by the protrusions so that the respective joining surfaces of the first and second plated steel sheets are inclined to each other and parts of the first and second plated steel sheets extending along the weld line are spaced a predetermined distance apart from each other.

12. A laser lap welding process of welding together overlapped first and second plated steel sheets, comprising the steps of:

partly deforming at least either of the first and second plated steel sheets so that a space is formed between joining surfaces of the first and second plated steel sheets when the first and second plated steel sheets are joined, to form a gas discharge passage between parts of the first and second plated steel sheets near a weld line; and irradiating parts of the first and second plated steel sheets extending on the weld line with a laser beam to weld together the first and second plated steel sheets;

wherein the gas discharge passage is formed by partly spacing the respective joining surfaces of the first and second plated steel sheets by a step formed in either of the first and second plated steel sheets.

* * * * *